Patented Feb. 27, 1940

2,191,767

UNITED STATES PATENT OFFICE 2,191,767

PROCESS FOR TREATING MINERAL OILS

Wilbert B. McCluer and Merrell R. Fenske, State College, Pa., assignors to Pennsylvania Petroleum Research Corporation, a corporation of Pennsylvania No Drawing. Application December 15, 1934, Serial No. 757,734

1 Claim. (Cl. 196—13)

This invention pertains generally to solvent mixtures and pertains particularly to solvent mixtures adapted for the solvent extraction of mineral oils.

The invention herein opens up an entirely new field of solvents for the extraction of lubricating oils and more particularly lubricating oils of Pennsylvania grade, in that a large number of highly selective solvents which are ordinarily unsatisfactory because of being substantially completely miscible with the oil are made available for industrial purposes.

The invention herein also opens up the industrial field to a large number of selective solvents which heretofore have been unsatisfactory because of an extremely low solvent capacity for the oil.

It has been found that certain solvents which have heretofore been regarded as unsuitable for solvent extraction purposes, because of being completely miscible with the oil at operating temperatures, exhibit, nevertheless, highly selective characteristics (as to molecular type) and that, by a reduction in the solvent capacity of these solvents, they may be made available for solvent extraction. This group will be referred to hereinafter as group A.

There are also certain solvents which exhibit highly selective characteristics, but have heretofore been generally regarded as unsuitable for use on a plant scale, in view of the large quantities required or, in other words, in view of a low solvent capacity for the oil at operating temperatures. This group will be referred to hereinafter as group B.

In accordance with this invention one or more solvents of group A, hereinafter referred to for convenience as "solvent A," is employed in conjunction with one or more solvents of group B, hereinafter referred to for convenience as "solvent B," in any one of a number of ways.

For instance, a suitable quantity of solvent A may be mixed with a suitable quantity of solvent B to form a solvent mixture with which the oil is not miscible in all proportions at operating temperatures. The solvent capacity of such a mixture may be adjusted by adjusting the proportions. For instance, to increase the solvent capacity, the proportion of solvent A to solvent B is increased and to decrease the solvent capacity, the proportion of solvent B to solvent A is increased. Many mixtures will have optimum proportions with respect to selectivity, from which operating ranges may be chosen.

On the other hand, solvent A may be mixed with the oil prior to its contact with solvent B. In this case, solvent A will disperse the oil particles, so to speak, so that such particles may be more intimately contacted by solvent B.

When solvent A is mixed with the oil and particularly when solvents A and B are completely miscible, or substantially so, solvent B may be used in a manner to scrub solvent A from the oil. A continuous countercurrent system of contact is particularly useful for this purpose. The solvent in the raffinate phase will then comprise chiefly solvent B, and substantially all of solvent A will find its way into the extract phase, along with the rest of solvent B. Operation in this manner may be preferred when solvent B is more readily removable from the better oil portion. Another advantage is that solvent A, which is of high miscibility with the oil, is replaced in the raffinate by solvent B which is of relatively low miscibility with the oil. Thus lesser quantities of solvent need be removed from the raffinate.

However, solvent B may be employed in any desired proportions regardless of the quantity of solvent A which it may be necessary to remove from the raffinate.

When solvent A and solvent B are only partially miscible, the solvents may be flowed countercurrently to each other, and the oil may be introduced intermediate the ends of the counterflow of solvents. Either two or three phases might be formed according to the proportions of solvents and according to their characteristics when contacting each other in the presence of oil.

Group A solvents for Pennsylvania grade lubricating oils are as follows:

(1) Aliphatic ketones having more than four carbon atoms, such as methyl propyl ketone, ethyl propyl ketone, and dipropyl ketone.

(2) Aliphatic esters of acetic acid having more than five carbon atoms, such as butyl acetate and amyl acetate.

(3) Aliphatic esters of formic acid having more than three carbon atoms, such as butyl formate, propyl formate, and amyl formate.

(4) Saturated cyclic hydrocarbons and derivatives thereof having rings with from five to six carbon atoms, such as cyclopentane, cyclohexane, cyclohexanone, methyl cyclohexanone, cyclohexanol, and cyclohexanyl acetate.

(5) Alkyl derivatives of toluidine, such as methyl toluidine, and ethyl toluidine (ortho).

(6) Chlorinated paraffin hydrocarbons, such as propylene dichloride, and amylene dichloride. Methylene dichloride and ethylene dichloride are also included in this group when substantially completely miscible at operating temperatures with the oil in process.

(7) Picoline (alpha).

(8) Terpineol.

All of the foregoing solvents are substantially completely miscible in all proportions with lubricating oils of Pennsylvania grade, except ethylene dichloride which at temperatures in the neighborhood of 32° F. is only partially miscible with bright stocks and cylinder stocks of Pennsylvania grade. Therefore, when this solvent is referred to as being completely miscible it is to be understood that the operating temperature, if necessary, is sufficiently high to effect substantially complete miscibility.

Solvents of group B for Pennsylvania grade lubricating oils are as follows:

Methyl alcohol, ethylene chlorohydrin, ethylene glycol monomethyl ether, methyl formate, tetrahydrofurfuryl alcohol, acetic acid, ethyl alcohol, aniline, diethylene glycol monoethyl ether, and a mixture of aliphatic esters known commercially as salvinol.

All of the latter solvents preferentially dissolve naphthenic constituents and are of extremely low miscibility or are substantially completely immiscible with lubricating oils of Pennsylvania grade. For instance, methyl formate is substantially completely immiscible with Pennsylvania grade lubricating oils.

As pointed out above, the proportions of solvents A and solvents B in the solvent mixtures are generally chosen to adapt the solvent mixtures to the uses to which they are to be put, preferably having due regard to optimum proportions with respect to selectivity.

The flexibility in proportions makes it possible to vary the solvent capacity of a mixture without change in temperature and without change in solvent to oil ratio. This has many advantages since a given installation will generally be designed to operate most efficiently on a more or less fixed range in temperature and solvent to oil ratio.

Furthermore, this flexibility makes it possible to operate at higher temperatures with heavier oils to increase the flow thereof, without taking into solution more than the desired amount of extract.

It is to be noted that when solvent A is mixed with the oil prior to its contact with solvent B, the viscosity of the oil will be very materially reduced. This is particularly advantageous when extracting relatively heavy oils, since, by this means, such oils may be contacted with solvent B as rapidly and effectively as relatively light oils.

Many variations will suggest themselves to persons skilled in the art upon becoming familiar with this invention. For instance, after a chosen mixture becomes saturated with oil, a part of such oil may be precipitated by adding more of the solvent of low miscibility with the oil.

In the claims the term "lubricating oil" when referred to is intended to mean an oil of a viscous character, that is, of the order of 35 Saybolt seconds at 210° F. or above.

In the claims the term "Pennsylvania grade residuum oil" is intended to mean a residuum resulting from the distillation of a Pennsylvania grade crude oil, or of a fraction thereof containing relatively heavy components, or a Pennsylvania oil fraction of comparable viscosity obtained by solvent fractionation or any other fractionating means, or a product of such residuum other than a distillate thereof, and is employed generically to include a mixture of such residuums.

Also, in the claims, where the terms "substantially completely miscible" and "substantially completely immiscible" are used, consideration is had for the operating temperature and these terms are intended to include the conditions of complete miscibility and of complete immiscibility respectively. When the term "completely immiscible" is employed in the claims it is to be understood that this use is a practicable one for, strictly speaking, all substances are miscible in infinitesimal quantities.

It is to be understood that the particular description herein is by way of illustration and that changes, omissions, additions, substitutions, and/or modifications may be made within the scope of the claim, without departing from the spirit of the invention which is intended to be limited only as required by the prior art.

We claim:

A process for extracting a lubricating oil of Pennsylvania grade, comprising first mixing with said oil a solvent which is selective as to molecular type, said solvent being completely miscible with said oil, thereafter contacting said mixture with a second solvent which is selective as to the same molecular type as said first solvent; said second solvent being relatively immiscible with said oil, said solvents being completely miscible with each other, and scrubbing said first solvent from said oil with said second solvent.

WILBERT B. McCLUER.
MERRELL R. FENSKE.